(12) United States Patent
Lopez Martinez

(10) Patent No.: US 12,257,970 B1
(45) Date of Patent: Mar. 25, 2025

(54) VEHICLE INTERIOR PANEL WITH FOLDED HINGE LAYER

(71) Applicant: Faurecia Interior Systems, Inc., Auburn Hills, MI (US)

(72) Inventor: Carlos Gerardo Lopez Martinez, Puebla (MX)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 0 days.

(21) Appl. No.: 18/671,375

(22) Filed: May 22, 2024

(51) Int. Cl.
*B60R 21/2165* (2011.01)
*B60R 21/205* (2011.01)
*B60R 21/215* (2011.01)

(52) U.S. Cl.
CPC ........ *B60R 21/2165* (2013.01); *B60R 21/205* (2013.01); *B60R 2021/21537* (2013.01)

(58) Field of Classification Search
CPC .............. B60R 21/2165; B60R 21/205; B60R 2021/21537
See application file for complete search history.

(56) References Cited

U.S. PATENT DOCUMENTS

| | | | |
|---|---|---|---|
| 8,096,577 | B2 | 1/2012 | Roring et al. |
| 8,348,303 | B1 | 1/2013 | Roring et al. |
| 10,384,632 | B2 | 8/2019 | Hoeing et al. |
| 11,407,372 | B2 | 8/2022 | Wehninck et al. |
| 11,524,651 | B2 | 12/2022 | Schulze Wehninck et al. |
| 12,065,096 | B1 * | 8/2024 | Lopez Martinez ... B60R 21/215 |
| 2014/0117649 | A1 * | 5/2014 | Hoeing ................. B60R 21/215 |
| | | | 156/443 |
| 2024/0208450 | A1 * | 6/2024 | Itkovic ................... B32B 7/022 |

FOREIGN PATENT DOCUMENTS

| | | | | |
|---|---|---|---|---|
| DE | 19735438 | A1 | 2/1999 | |
| DE | 102009048686 | A1 * | 4/2011 | .......... B60R 21/215 |
| DE | 102010015256 | A1 * | 10/2011 | .......... B60R 21/216 |
| WO | 2007147966 | A2 | 12/2007 | |
| WO | 2008101681 | A1 | 8/2008 | |

\* cited by examiner

*Primary Examiner* — Faye M Fleming
(74) *Attorney, Agent, or Firm* — Reising Ethington P.C.

(57) ABSTRACT

A vehicle interior panel for use over an airbag includes a hinge layer with a folded portion having nested folds. The folded portion interconnects a first portion embedded in an airbag door region of a panel substrate with a second portion embedded in the panel substrate outside the airbag door region. The nested folds are simpler and faster to form than other types of folds and contribute to improved airbag door kinematics.

20 Claims, 6 Drawing Sheets

VEHICLE INTERIOR PANEL WITH FOLDED HINGE LAYER

TECHNICAL FIELD

The present disclosure is related generally to vehicle interior panels and, more particularly, to such panels for use over an airbag.

BACKGROUND

Vehicle interior panels used over airbags are typically made to split along a tear seam formed in the panel when airbag inflation forces press against the back side of the panel. Part of the panel becomes a door or flap that pivots away from the remainder of the panel to permit the airbag to deploy into the passenger cabin of the vehicle. Improvements have been made to such panels since these types of airbags were first introduced in vehicles. One such improvement was the inclusion of a high-tensile strength tether affixing the airbag door or flap to the surrounding panel to prevent it from entirely breaking away from the panel in the event that the airbag door hinge breaks.

In one example, DE 10 2009 048 686 by Laboeck et al. discloses a tether with one or two folds that provide additional length such that the airbag door is easier to push out of the way of the inflating airbag. According to Laboeck, such folds must be protected from the surrounding injection molding material, which can prevent the folds from unfolding and make the additional tether length useless.

SUMMARY

An embodiment of a vehicle interior panel for use over an airbag includes a panel substrate having an airbag door region, and a flexible hinge layer. The hinge layer has a first portion at least partially embedded in the airbag door region, a second portion at least partially embedded in the panel substrate outside the airbag door region, and a third portion interconnecting the first and second portions. The third portion includes nested folds.

Another embodiment of the panel includes the features of the previously listed embodiment, and a total number of overlapping segments of hinge material in the third portion is an even number.

Another embodiment of the panel includes the features of any of the previously listed embodiments, and a total number of folds in the third portion is an odd number.

Another embodiment of the panel includes the features of any of the previously listed embodiments, and the third portion is a wound portion in which hinge material is wrapped around at least one of the folds.

Another embodiment of the panel includes the features of any of the previously listed embodiments, and the third portion includes a double layer of hinge layer material having a wound conformation.

Another embodiment of the panel includes the features of any of the previously listed embodiments, and at least one of the nested folds is nested within at least two other of the nested folds.

Another embodiment of the panel includes the features of any of the previously listed embodiments, and at least one of the nested folds is nested within at least three other of the nested folds.

Another embodiment of the panel includes the features of any of the previously listed embodiments, and the third portion includes multiple segments of overlapping hinge material that are affixed to each other.

Another embodiment of the panel includes the features of any of the previously listed embodiments, and the third portion is at least partially embedded in the panel substrate.

Another embodiment of the panel includes the features of any of the previously listed embodiments, and the hinge layer is a sheet of material having openings defined therethrough.

Another embodiment of the panel includes the features of any of the previously listed embodiments, and the hinge layer is formed from a sheet of material having uniform tensile characteristics along its entire length and its entire width.

Another embodiment of the panel includes the features of any of the previously listed embodiments, and the hinge layer comprises warp and weft fibers and a polymeric coating disposed on the fibers.

A method of making the vehicle interior panel of any of the previously listed embodiments includes winding a sheet of hinge material to form a wound portion of hinge material and compressing the wound portion to form the third portion of the hinge layer such that overlapping segments of the hinge material are retained to each other in the third portion.

In another embodiment of the method, the sheet of hinge material includes a coating that adheres to itself where the overlapping segments contact each other during compression.

Another embodiment of the method includes the features of any of the previously listed methods and additionally includes the step of overmolding the panel substrate onto the hinge layer after the step of compressing. The step of overmolding includes at least partially embedding the first portion in the airbag door region, the second portion in the panel substrate outside the airbag door region, and the third portion in the panel substrate along a boundary of the airbag door region.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel for use over an airbag. The panel includes a hinge layer that includes a portion configured to unfold in a controlled manner during airbag deployment. The hinge layer includes nested folds and is simpler and faster to make than traditional accordion- or serpentine-type folds. The hinge layer can be made without expensive specialty materials that have been proposed by others to control airbag door kinematics during airbag deployment. Contrary to prior art teachings, the folded portion of the hinge layer can be embedded in the panel substrate material to improve airbag door kinematics.

Figure 1:
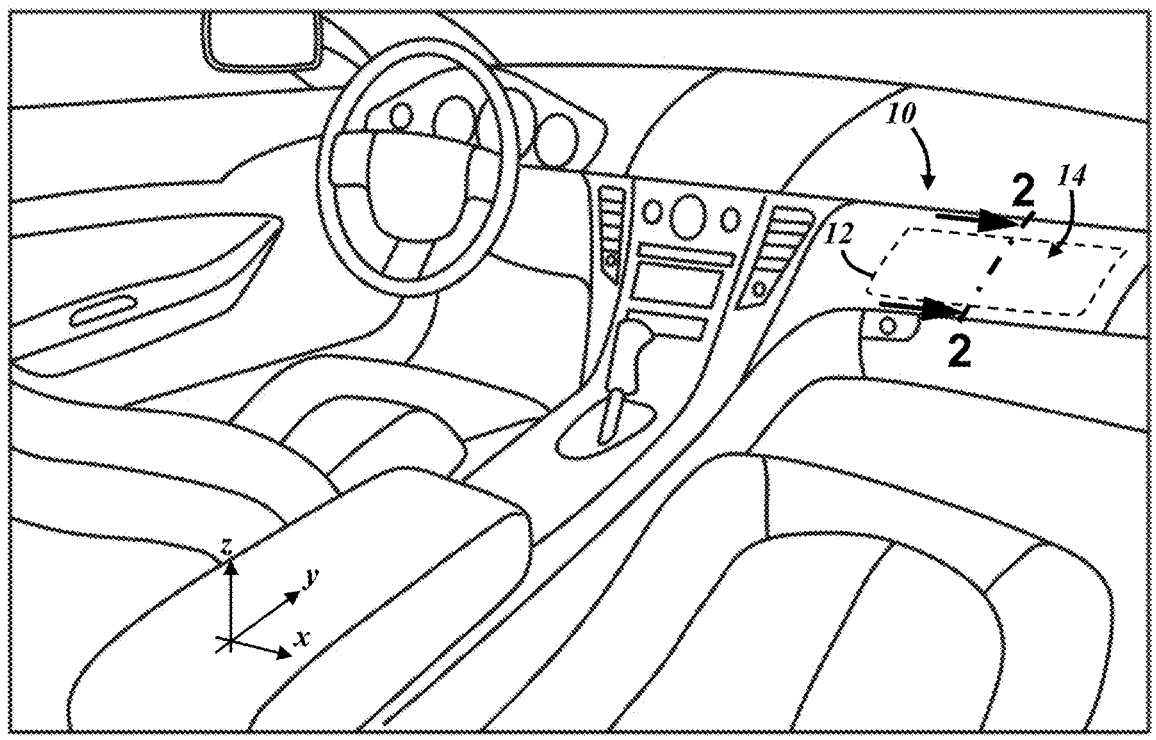
FIG. 1 is a perspective view of an illustrative vehicle interior panel installed in a vehicle passenger.

FIG. 1 is a perspective view of the forward part of a vehicle passenger cabin equipped with a vehicle interior panel 10. The panel has a hidden tear seam 12 along which the panel splits during inflation and deployment of an underlying airbag in the event of a vehicle collision. The tear seam 12 is defined along one or more lines along the panel 10 where the panel 10 is intentionally weakened. This weakening may be in the form of perforations, locally thinned material, notches, or other stress concentrators included in one or more layers of the panel 10. The illustrated panel 10 is an instrument panel or dashboard, and the tear seam 12 has a rectangular shape that defines an airbag door region 14 of the panel.

Figure 2:
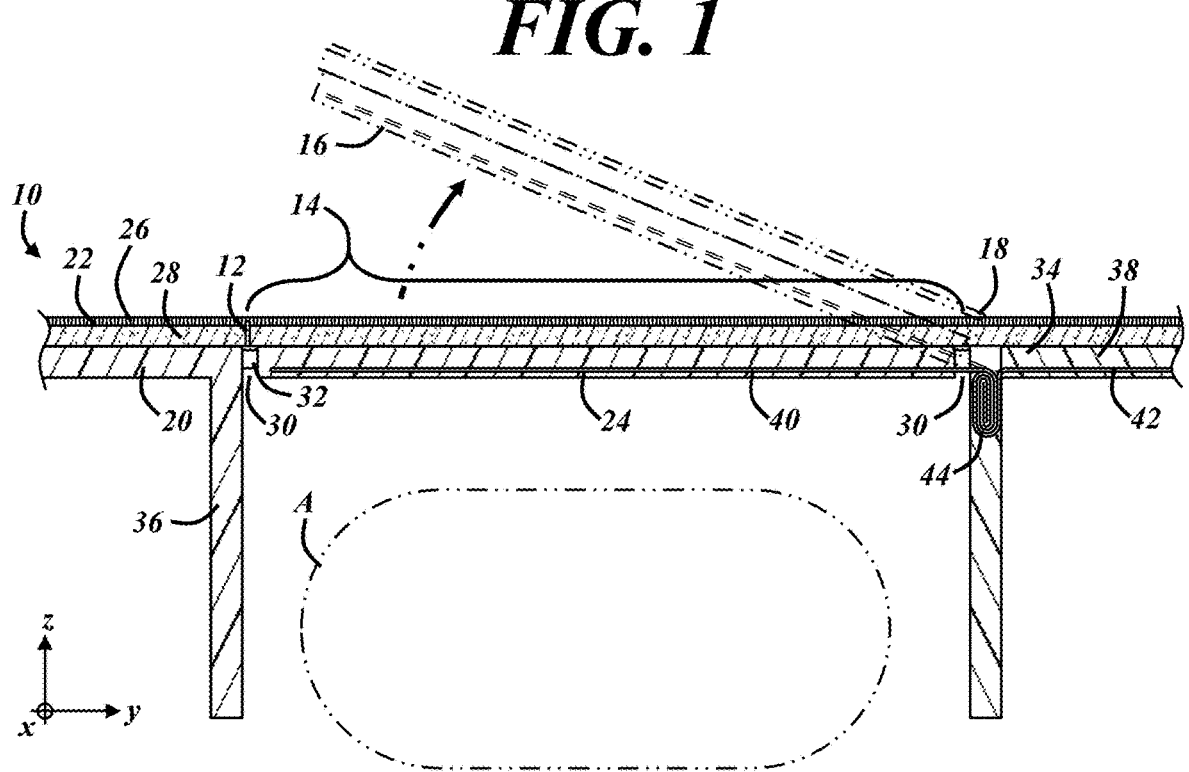
FIG. 2 is a cross-sectional view of the panel of FIG. 1 illustrating a hinge layer embedded in a panel substrate.

FIG. 2 is a cross-sectional view of the panel 10 of FIG. 1 schematically depicting an airbag A underlying the panel. During airbag deployment, airbag inflation forces cause the panel 10 to split along the tear seam 12, and an airbag door 16 defined within the airbag door region 14 pivots along a hinge side 18 of the airbag door or otherwise moves outwardly away from the surrounding portion of the panel, as illustrated in phantom in FIG. 2. While illustrated in the context of an instrument panel 10 and a rectangular tear seam 12, the structures and methods described below are adaptable to other vehicle interior panels (e.g., door panels, steering wheel panels, pillar panels, seat panels, etc.) and to other tear seam shapes (e.g., H-shape, Y-shape, X-shape, non-symmetric shapes, etc.). In other examples, the panel 10 is a drop-in airbag module attached along the outer side of a surrounding panel or an underlying airbag module attached along the inner side of a surrounding panel and having an airbag deployment opening aligned with the airbag door region 14. The decorative covering 22 is optional and may be a monolayer or a backfilled skin layer in other examples.

The illustrated panel 10 is a multi-layer panel including a panel substrate 20, a decorative covering 22, and a flexible hinge layer 24. The panel substrate 20 may be formed from a polymer-based material (e.g., glass-filled polypropylene, mineral-filled polyethylene, TPO, TPE) in a molding operation and provides the overall shape and structure of the finished panel 10. At least a portion of the hinge layer 24 may be overmolded with the molding material of the panel substrate 20. The decorative covering 22 provides the outer decorative surface of the panel 10 that faces the interior of the vehicle passenger cabin when installed in the vehicle. The illustrated decorative covering 22 is a two-layer component including a decorative outer skin layer 26 (e.g., polymer film or leather) and an intermediate layer 28 (e.g., foam or spacer fabric) between the substrate 20 and skin layer.

The tear seam 12 in this example includes perforations in the decorative covering 22 aligned with through-openings 30 formed through the panel substrate 20 along the perimeter of the airbag door region 14. The through-openings 30 may be in the form of slots that at least partly define the perimeter of the airbag door 16. The tear seam 12 is non-visible from the passenger cabin, with the perforations formed only part way through the decorative covering 22 and the through-openings 30 concealed by the decorative covering.

In the illustrated example, the airbag door 16 is attached to the surrounding portion of the panel substrate 20 by small tabs or material bridges 32 spaced along the perimeter of the airbag door region 14 and spanning the gap formed by the through-openings. The tabs 32 break during airbag deployment to allow the door 16 to move away from the surrounding portion of the substrate 20. The flexible hinge layer 24 spans the through-openings 30 along the hinge side 18 of the airbag door region 14 and functions partly as a hinge, permitting rotation of the airbag door 16 about a transverse (x) axis, and partly as a tether that retains the airbag door to the remainder of the panel 10 after it breaks away from the surrounding portion of the substrate 20, thereby preventing the airbag door 16 from becoming a loose projectile in the passenger cabin.

The panel substrate 20 includes a main body 34 and a chute 36. The main body 34 provides the contour of the panel 10 underlying and directly supporting the decorative covering 22. The main body 34 includes the airbag door 16 and an outer portion 38 outside the airbag door region 14. The chute 36 is formed by one or more walls extending away from the back side of the main body 34 and at least partly surrounds the airbag door region 14. The illustrated chute 36 is integrally molded as one-piece with the body 34 and is configured to constrain and guide the deploying airbag A toward the airbag door 16 and into the passenger cabin. While not shown here, the panel substrate 20 may also include a network of stiffening ribs along the back side of the airbag door region 14 and airbag door 16. Such ribs may be overmolded onto the hinge layer 24 in the same molding operation as the main body 34 and chute 36.

The flexible hinge layer 24 can be of any suitable material and construction. As illustrated in FIG. 2, the hinge layer 24 can be formed from a sheet of hinge material having a nominally uniform thickness with planar dimensions much larger than the thickness. For instance, the thickness may be on the order of 1 millimeter (e.g., 0.5 mm to 2.0 mm) while each planar dimension is on the order of hundreds of millimeters—i.e., at least two orders of magnitude larger than the thickness. As used here, "flexible" means that the force required to bend the sheet of hinge material out of plane is negligible relative to the force required to bend the substrate 20 in which it is embedded.

The hinge layer 24 may be formed from a sheet of fabric or film hinge material and is at least partially embedded in the panel substrate 20. A fabric material may be woven or non-woven and may have little to no flexural modulus—e.g., it cannot necessarily extend horizontally as a flat sheet while supporting its own weight. The fabric may be made from or include natural and/or synthetic fibers (e.g., nylon or other polymer, glass, metal, or carbon fibers) that provide the hinge material with a tensile strength greater than that of the material of the substrate 20. A film hinge material may be a polymer film or metal foil and may or may not have natural or synthetic fibers embedded therein.

In some embodiments, the hinge material is in the form of a net including fibers (e.g., polyester or aramid) oriented in multiple planar directions with openings into which the overmolded substrate material can flow. Such a net may for example include mutually perpendicular warp and weft fibers defining generally rectangular openings. The net or other hinge material may have a tensile strength greater in one direction than in a perpendicular planar direction and, in use, the stronger direction may be oriented in the y-direction of FIG. 2. While the tensile strength and/or elongation properties of the hinge layer material may be different in different planar directions, they may be uniform along the piece of hinge material in any planar direction. For example, the hinge material may include fibers with a uniform woven, knitted, or layered pattern throughout the hinge material. In particular, the portion of the hinge material configured to unfold during airbag deployment has the same tensile properties and/or fiber configuration as the remainder of the hinge material.

The hinge material may include a polymeric coating. This coating can perform multiple functions, such as providing flame-retardance, enhancing bonding of the hinge layer 24 with the material of the panel substrate 20, or providing adhesive properties that cause the material to adhere to itself when one portion is pressed against another. The coating may be a relatively soft, low tensile strength material, such as a PVC plastisol material or a low durometer polyurethane material and may be applied in a spray-coating process to one or both sides of the fabric or film. Where perforations or other openings are formed through the hinge material, the coating may be applied in a manner that preserves the presence of openings through the coated material, or the openings may be formed after the coating is applied.

The flexible hinge layer 24 has a first portion 40 at least partially embedded in the airbag door region 14, a second portion 42 at least partially embedded in the panel substrate 20 outside the airbag door region, and a third portion 44 interconnecting the first and second portions. The first portion 40 may be referred to as the door portion and extends from the third portion 44 along a majority of the length (in the y-direction) of the airbag door 16 and up to the full length of the airbag door. The first portion 40 of the hinge layer 24 may also extend along a majority of the width (in the x-direction) of the airbag door 16 and up to the full width of the airbag door. This provides a large surface area along which the first portion 40 of the hinge layer 24 is in contact with the material of the panel substrate 20, particularly in embodiments where the hinge layer is formed from a net or material with openings formed through it.

In the illustrated example, the second portion 42 of the hinge layer 24 extends from the third portion 44 and is embedded in the outer portion 38 of the main body 34 of the substrate 20. A length of the second portion 42 similar to that of the first portion 40 may be embedded in the panel substrate 20, to the extent possible. For example, the second portion may extend within the substrate 20 of the instrument panel 10 of FIG. 1 in an amount greater than 50 mm and up to the forwardmost edge of the panel nearest the windscreen. In another embodiment, the second portion 42 is at least partially embedded in a wall of the chute 36 instead of the outer portion 38 of the main body 34.

The third portion 44 is a folded portion interconnecting the first and second portions 40, 42 and configured to unfold at a threshold tensile load in a direction tending to pull the first portion 40 away from the folded portion. The folded portion 44 includes nested folds and is easier and faster to make than serpentine-type folds. In the illustrated embodiment, the folded portion 44 is embedded in the panel substrate 20. At least a portion of the transverse (x) width, and up to the entire width, of the folded portion 44 may be fully embedded in the material of the panel substrate 20. The degree of embedding of the folded portion 44 in the panel substrate 20 can be used to set the threshold tensile load at which unfolding of the hinge layer 24 occurs.

In the example of FIG. 2, the folded portion 44 is embedded in the panel substrate 20 along a boundary of the airbag door region 14. In particular, the folded portion 44 is embedded in a wall of the chute 36 of the substrate 20 in FIG. 2, which is outside the airbag door region 14. In other examples, the folded portion 44 may be embedded in the outer portion 38 of the main body 34 of the substrate 20 and/or the second portion of the hinge layer 24 may be embedded in the chute 36.

Figure 3:
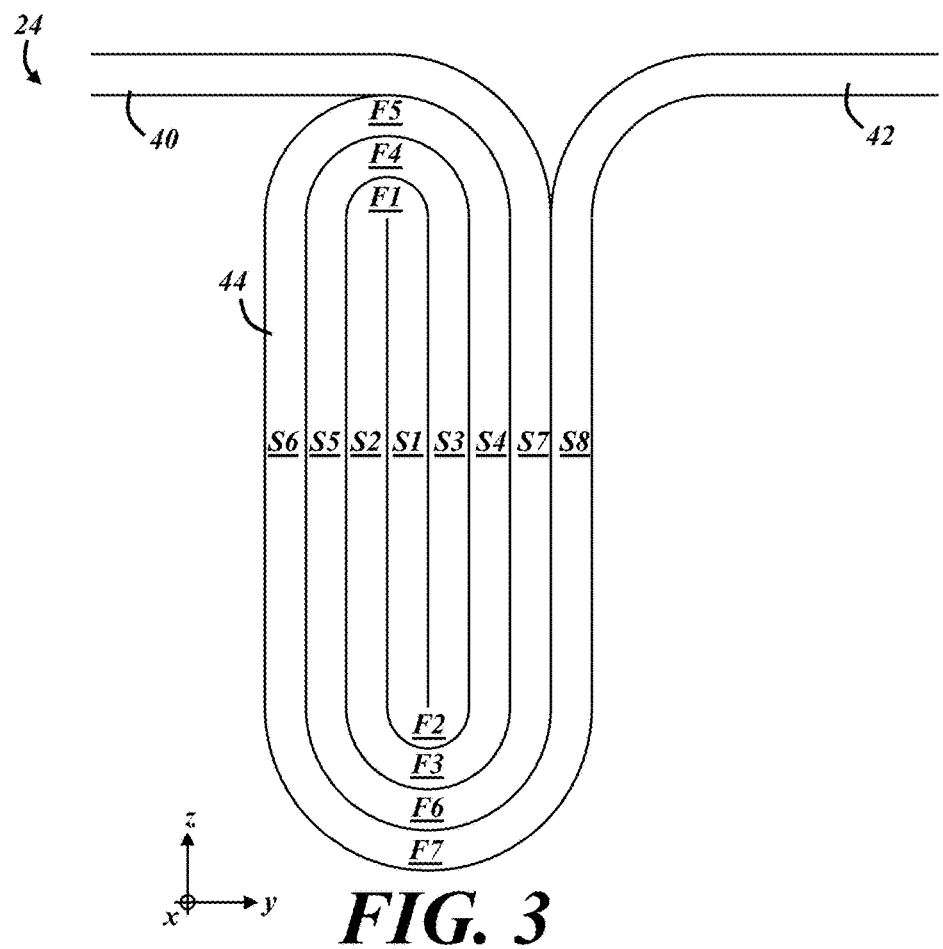
FIG. 3 is an enlarged view of a folded portion of the hinge layer of FIG. 2.

FIG. 3 is an enlarged view of the folded portion 44 of the hinge layer 24 of the panel of FIG. 2 before being overmolded by the material of the panel substrate 20. As noted above, the folded portion 44 includes nested folds, meaning one fold fits within another fold. The illustrated example includes a total of seven nested folds F1-F7 interconnecting eight segments S1-S8 of hinge material. Each fold is defined where two segments of the hinge material are joined at a bend and extend away from the bend with a component in the same direction. In FIG. 3, every segment S1-S8 extends away from its corresponding fold F1-F7 in the vertical (z) direction, and each fold F1-F7 is defined at a 180-degree bend in the hinge material. The 90-degree bends joining segments S6 and S8 of the folded portion 44 with the respective first and second portions 40, 42 of the hinge layer 24 are not considered folds for purposes of this description.

The first fold F1 interconnects the first and second segments S1, S2 and is nested within the fourth and fifth folds F4, F5. The second fold F2 interconnects the first and third segments S1, S3 and is nested within the third, sixth, and seventh folds F3, F6, F7. The third fold F3 interconnects the second and fourth segments S2, S4 and is nested within the sixth and seventh folds F6, F7. The fourth fold F4 interconnects the third and fifth segments S3, S5 and is nested within the fifth fold F5. The fifth fold F5 interconnects the fourth and sixth segments S4, S6 and is nested with the first and fourth folds F1, F4 but not nested within any of the other folds. The sixth fold F6 interconnects the fifth and seventh segments S5, S7 and is nested within the seventh fold F7. The seventh fold F7 interconnects the sixth and eighth segments S6, S8 and is nested with the second, third, and sixth folds F2, F3, F6 but not nested within any of the other folds.

The total number $N_F$ of folds is equal to the total number $N_S$ of segments minus one ($N_F=N_S-1$). When the folded portion 44 is formed as described in conjunction with the subsequent figures, the hinge layer 24 may include an even number of segments and an odd number of folds. The folded portion 44 may also be referred to as a wound portion in which the hinge material is wrapped around at least one of the folds. In the example of FIG. 3, the portion of the hinge material forming folds F4 and F5 is wrapped around the first fold F1. In embodiments where the second portion 42 of the hinge layer 24 is embedded in the chute 36 of the panel substrate 20, the seventh fold F7 and eighth segment S8 are omitted such that the folded portion 44 has an odd number of segments and an even number of folds.

The example of FIG. 3 also includes a double layer of the hinge material in a wound conformation. The referenced double layer of hinge material is the double layer formed at and extending away from the first fold F1. Following the double layer away from the first fold F1, the double layer begins with segments S1 and S2, proceeds through the bends at folds F2 and F3 to become segments S3 and S4, proceeds through the bends at folds F4 and F5 to become segments S5 and S6, and then proceeds through the bends at folds F6 and F7 to become segments S7 and S8. The double layer then splits into two single layers bending in opposite directions to become the first and second portions 40, 42 of the hinge layer.

Figure 4:
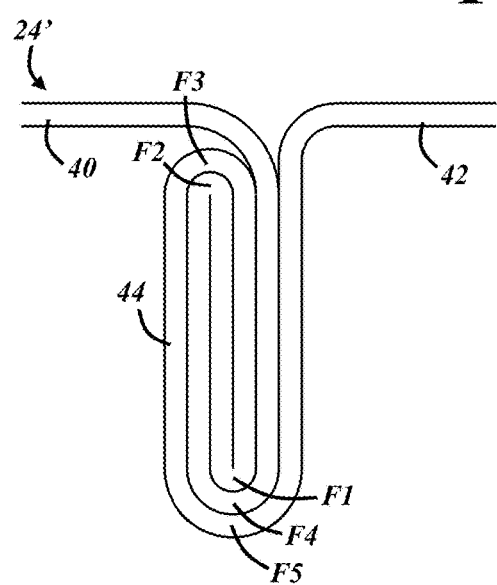
FIG. 4 is an enlarged view of the folded portion of the hinge layer with less folds than in FIG. 3.
Figure 5:
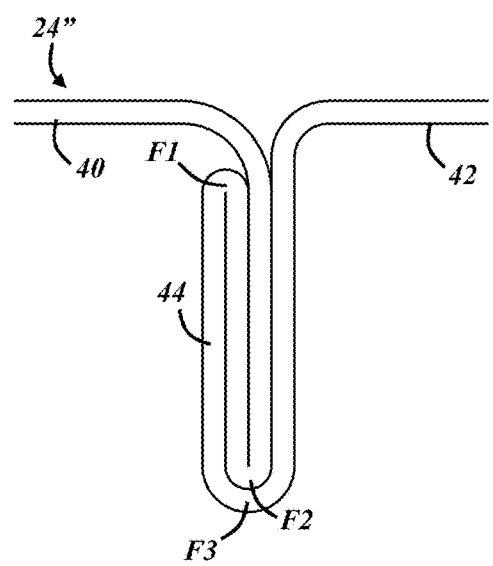
FIG. 5 is an enlarged view of the folded portion of the hinge layer with less folds than in FIGS. 3 and 4.

The folded portion 44 may include more or less folds than in FIG. 3. For example, the hinge layer 24' of FIG. 4 includes five folds F1-F5, each of which is nested with at least one other fold. The hinge layer 24" of FIG. 5 includes three folds F1-F3, two of which are nested folds (F1 is not nested with another fold). These examples share some characteristics with the hinge layer of FIG. 3. All three examples include an odd number of folds interconnecting a corresponding even number of segments. Each example includes a double layer of hinge material folded back on itself at least once. Also in each example, the folded portion 44 is a wound portion with the hinge material wrapped around at least one fold.

The configuration of each illustrated folded portion 44 also has at least one performance characteristic different from that of traditional accordion or serpentine folds. In particular, after the threshold tensile force is reached and the folded portion 44 begins to unwind, pairs of nested folds are unfolded simultaneously. In the example of FIG. 3, for instance, a tensile force on the first portion 40 is transferred via segment S7 to fold F6, which unfolds together with fold F7. Similarly, folds F4 and F5 unfold together, and folds F2 and F3 unfold together, with fold F1 being the last to unfold. The means a faster lengthening of the hinge layer once the tensile threshold is reached.

FIGS. 6-11 schematically illustrate a portion of a method of making the vehicle interior panel 10, including formation of the hinge layer 24 to include the folded portion 44 prior to overmolding. The method includes winding a sheet 124 of hinge material to form a wound portion 144 of hinge material and then compressing the wound portion to form the folded portion 44.

Figure 6:
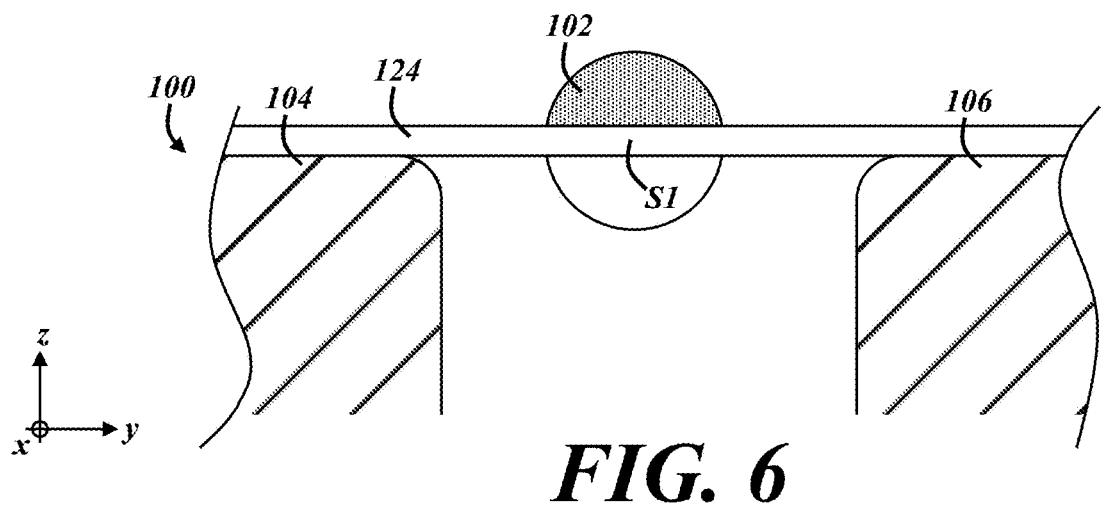
FIG. 6 is a side view of hinge material engaged with a winder.

With reference to FIG. 6, the sheet 124 of hinge material is engaged by a winding tool 100, including a winder 102 located between first and second tool portions 104, 106 acting as guide blocks. The spacing between the guide blocks 104, 106 may be sufficiently large to accommodate the wound portion 144 after the desired amount of rotation of the winder 102. The length of the sheet 124 is equal to the combined length of the first, second, and third portions 40-44 of the finished hinge layer 24. The winder 102 is slotted to accommodate the thickness of the sheet 124 of material and engages the hinge material at a location corresponding to the first segment S1 of the folded portion 44 of FIG. 3.

Figure 7:
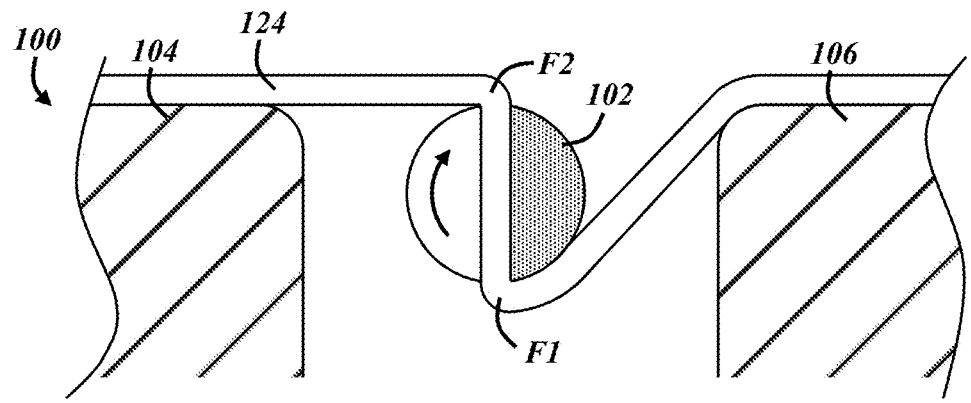
FIG. 7 illustrates the hinge material of FIG. 6 after one-quarter turn of the winder.

The winder 102 is then rotated about its rotational axis to begin winding the sheet 124 of material about the perimeter of the winder. During rotation of the winder 102, the sheet 124 of hinge material is permitted to be fed between the guide blocks 104, 106 and along the outer surface of the winder. FIG. 7 depicts the winding tool 100 after a one-quarter rotation of the winder 102, at which time the bends in the hinge material that will become folds F1 and F2 of FIG. 3 are formed. The rotational axis of the winder 102 is moved downward in FIG. 7 and in each subsequent figure to keep the hinge material in contact with the top surfaces of the guide blocks 104, 106.

Figure 8:
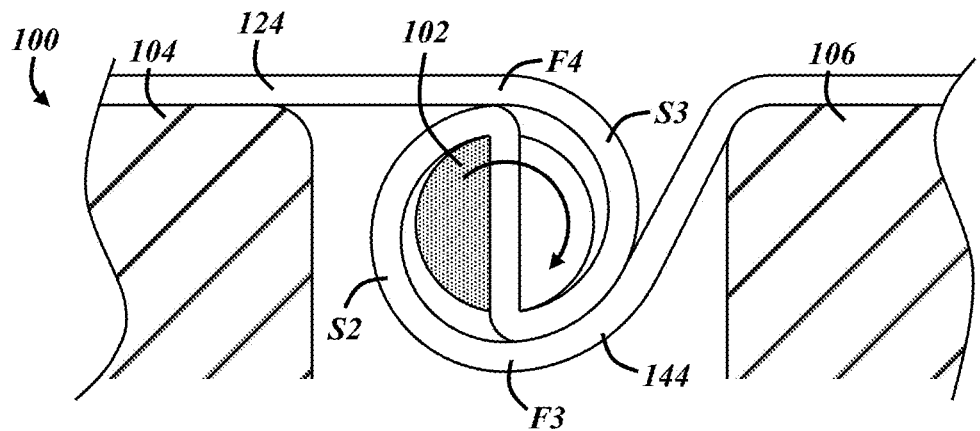
FIG. 8 illustrates the hinge material of FIG. 7 after an additional half turn of the winder.

FIG. 8 depicts the winding tool 100 after an additional one-half rotation of the winder 102 (a three-quarter rotation relative to FIG. 6), at which time the future locations of folds F3 and F4 become apparent, along with segments S2 and S3. The hinge material now includes a wound portion 144. The folded portion 44 could be formed from the wound portion 144 of FIG. 8 to form the hinge layer 24" of FIG. 5.

Figure 9:
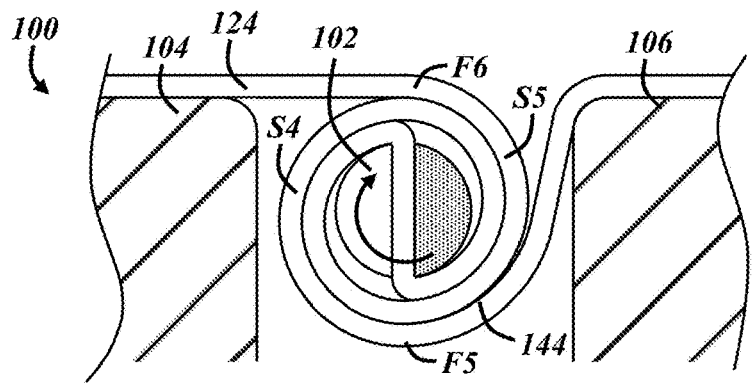
FIG. 9 illustrates the hinge material of FIG. 8 after an additional half turn of the winder.

FIG. 9 depicts the winding tool 100 after an additional one-half rotation of the winder 102 (one and one-quarter rotations relative to FIG. 6), at which time the future locations of folds F5 and F6 become apparent, along with segments S4 and S5. The folded portion 44 could be formed from the wound portion 144 of FIG. 9 to form the hinge layer 24' of FIG. 4.

Figure 10:
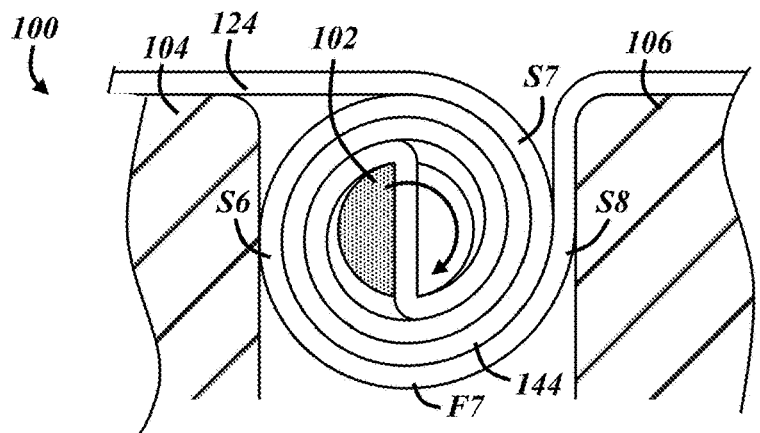
FIG. 10 illustrates the hinge material of FIG. 9 after an additional half turn of the winder.
Figure 11:
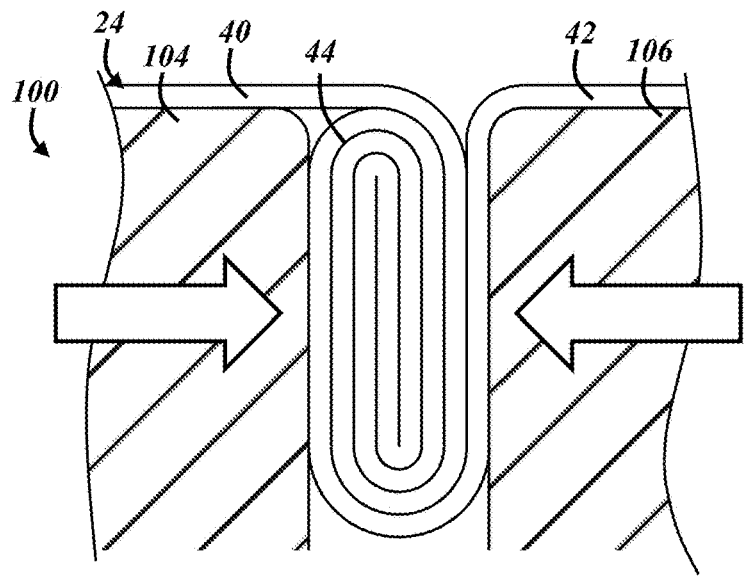
FIG. 11 illustrates compression of a wound portion of the hinge material of FIG. 10 to form the folded portion of the hinge layer of FIGS. 2 and 3.

FIG. 10 depicts the winding tool 100 after an additional one-half rotation of the winder 102 (one and three-quarter rotations relative to FIG. 6), at which time the future location of fold F7 becomes apparent, along with segments S6-S8. After withdrawing the winder 102 in the widthwise direction from the wound portion 144 of hinge material in FIG. 10, the wound portion can be compressed as in FIG. 11 to form the hinge layer 24 with the folded portion 44 as in FIG. 3.

It should be noted that the compression step is not strictly required, which is to say that the wound portion 144 in FIGS. 8-10 is one version of a folded portion 44 that may be included in the finished hinge layer 24. In other words, skilled artisans may reap the benefits of the disclosed nested folds even without compressing the wound portion and/or by forming nested folds in some other manner than that depicted in FIGS. 6-11. It is also noted that the overlapping segments S1-S8 of the folded portion may not be exactly rectilinear and parallel with each other as depicted in the figures, as some relaxation toward the initially wound conformation may occur after removing the compression forces.

The method may also include configuring the wound or folded portion 44 of the hinge layer 24 so that the overlapping segments of hinge material are retained to each other such that the wound conformation is maintained in subsequent handling operations such as transferring the hinge layer 24 to a molding machine for overmolding of the panel substrate 20. This can be accomplished by affixing each of the segments S1-S8 with at least one adjacent segment—e.g., affixing segments S4 and S7 to each other.

Embodiments of the method include adhering at least one segment of the folded portion 44 to another segment of the folded portion. This may include use of an adhesive layer on the sheet 124 of hinge material, for example. In embodiments where the hinge material includes a coating, the coating may serve as the adhesive layer. For instance, the coating may be formed from a pressure-sensitive adhesive material that will not stick to the winder 102 of the winding tool but will stick to adjacent segments of the wound portion 144 upon compression. This type of coating may adhere to itself where the overlapping segments contact each other during compression. The coating need not be specifically designed for use as a traditional pressure-sensitive adhesive, however. The coating may be formed from a sufficiently soft polymeric material that plastically deforms during the compression step of FIG. 11, for example, such that some of the coating material flows into openings of the hinge material. Or the coating may be tacky (i.e., weakly adhesive) such that it tends to adhere to itself, particularly under compression.

In other examples, thermal energy can be applied to adhere adjacent segments of the wound portion 144 together before and/or during compression. Thermal energy can be applied via heated air, radiant heat, heated tool portions 104, 106, ultrasonic energy, or any other suitable source. Thermal energy can soften or at least partly melt a coating of the hinge material or uncoated polymeric material of the hinge material, such as fibers or a film. Other options include application of a solvent to partly dissolve surfaces of the hinge material to cause them to adhere to each other, or the use of mechanical fastenings such as stitches of thread, staples, clips, etc. In some embodiments, the surfaces of the tool portions 104, 106 that contact the wound portion 144 during compression are shaped to form a crimp or otherwise cause some portion of one or more of the segments S1-S8 to bend out of plane in a shape that causes adjacent segments to be held together. For example, the tool surfaces may have a diamond-patterned knurl or serrations where they contact the wound portion 144 such that portions of the outermost segments are deformed or indented and pressed into underlying segments. Or the folded portion 44 can be pierced at multiple locations using a barbed piercing tool that pulls some hinge material through a pierce hole when withdrawn. Other affixing techniques and materials are possible. In embodiments where the folded portion 44 is overmolded during molding of the panel substrate, the overlapping segments S1-S8 of hinge material need only stay together until the hinge layer 24 is transferred to the molding machine.

Figure 12:
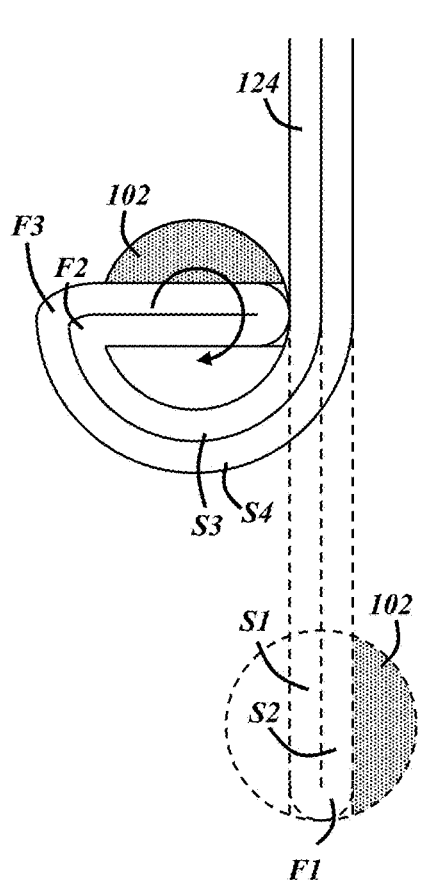
FIG. 12 is a side view of folded hinge material engaged with a winder and the wider rotated three quarters of a turn.
Figure 13:
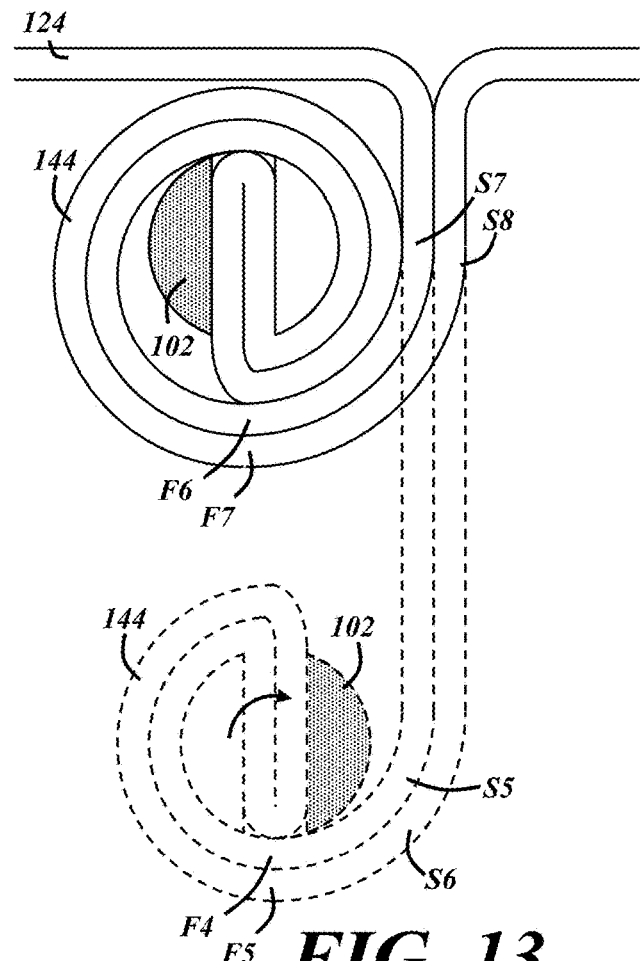
FIG. 13 illustrates the hinge material of FIG. 12 after an additional quarter turn of the winder and an additional half turn of the winder.
Figure 14:
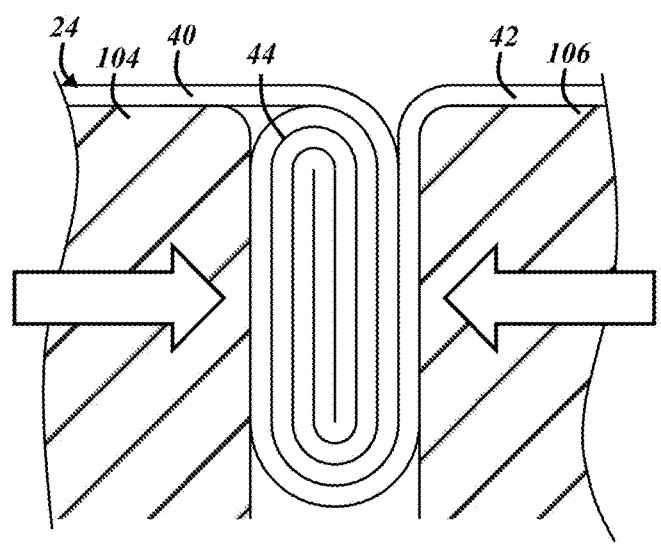
FIG. 14 illustrates compression of the wound portion of hinge material of FIG. 13 to form the folded portion of the hinge layer of FIGS. 2 and 3.

FIGS. 12-14 schematically illustrate part of a modified method of making the vehicle interior panel 10, including formation of the hinge layer 24 to include the folded portion 44 prior to overmolding. As in the previous example, the method includes winding the sheet 124 of hinge material to form a wound portion 144 of hinge material and then compressing the wound portion to form the folded portion 44.

With reference to FIG. 12, the sheet 124 of hinge material is engaged by a winder 102 of a winding tool. The winder 102 is slotted to accommodate the thickness of a double layer of the sheet 124 of material and is then rotated to wind the double layer of material about its perimeter. In this example, the sheet of material is first folded to form fold F1 of the finished folded portion 44 and then engaged by the winder 102 as shown in broken lines in FIG. 12. At this initial step, the location of the first fold F1 and the first and second segments S1, S2 are already defined.

FIG. 12 also depicts the sheet 124 of hinge material after a three-quarter rotation of the winder 102, at which time the bends in the hinge material that will become folds F2 and F3 of FIG. 3 become apparent, along with segments S3 and S4. The rotational axis of the winder 102 is moved upward in FIG. 12 and in each subsequent figure as the double layer of hinge material is wound around the winder 102.

FIG. 13 depicts in broken lines the winding tool 100 after an additional one-quarter rotation of the winder 102 (a full rotation relative to the starting point in broken lines in FIG. 12). At this time, the future locations of folds F4 and F5 become apparent, along with segments S5 and S6. The folded portion 44 could be formed from the wound portion 144 of FIG. 13 to form the hinge layer 24' of FIG. 4.

FIG. 13 also depicts the sheet 124 of hinge material after another one-half rotation of the winder 102, at which time the bends in the hinge material that will become folds F6 and F7 of FIG. 3 become apparent, along with segments S7 and S8. After withdrawing the winder 102 in the widthwise direction from the wound portion 144 of hinge material in FIG. 13, the wound portion can be compressed between opposing tool portions 102, 104 as in FIG. 14 to form the folded portion 44 of FIG. 3. The overlapping segments of hinge material can be fixed together as described above to maintain the wound conformation of the folded portion.

Figure 15:
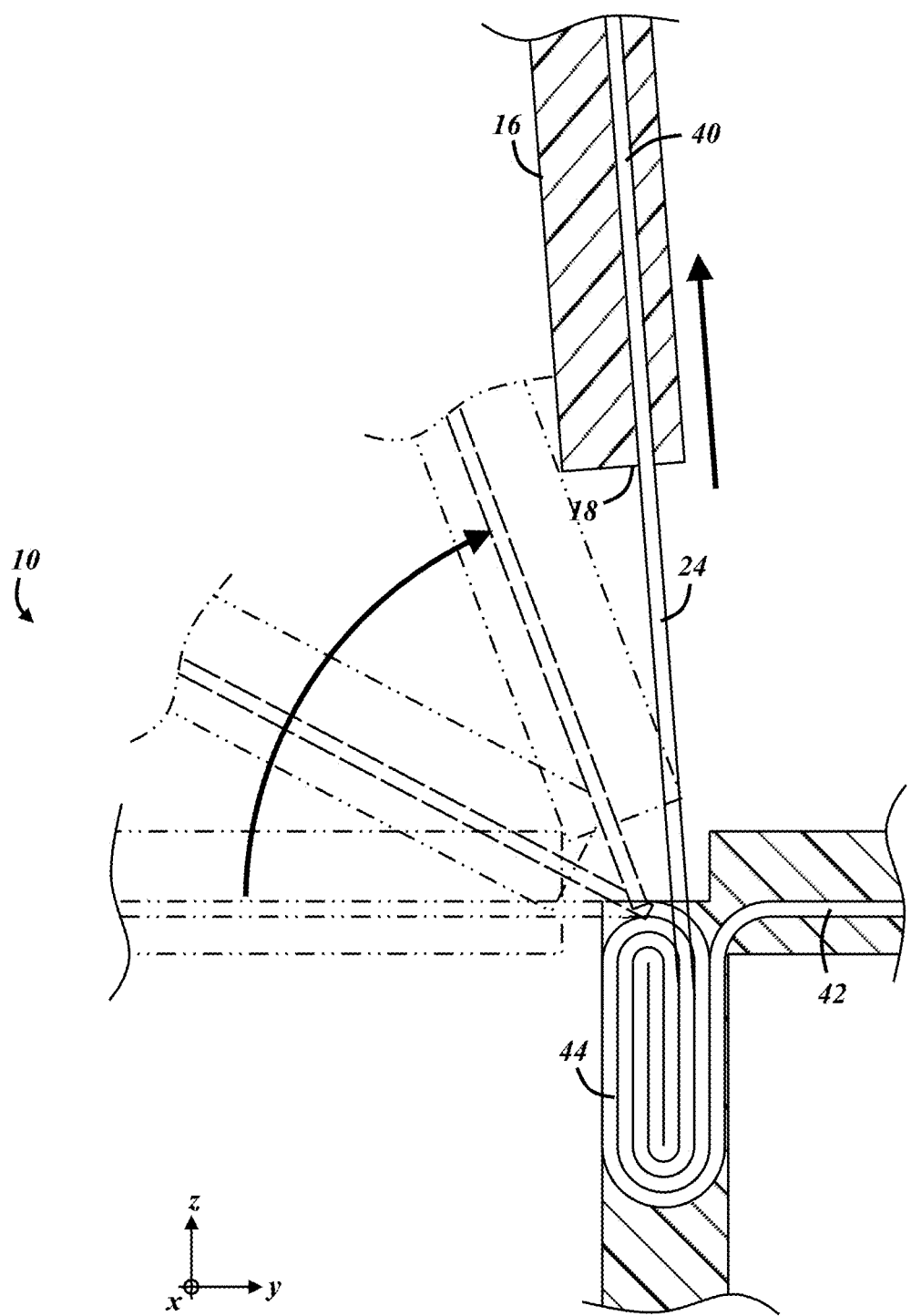
FIG. 15 is an enlarged view of the panel of FIG. 2 illustrating kinematics of the airbag door during airbag deployment.

FIG. 15 illustrates predicted airbag door kinematics provided by the folded portion 44 of the above-described hinge layer 24. The combination of nested folds of the folded portion 44—which provides a higher number of layers of overlapping hinge material with less folding operations than serpentine-type folds do—and at least partially embedding the folded portion 44 in the panel substrate 20 causes the airbag door 16 to exhibit pivoting motion about a transverse (x) axis for a longer duration than other airbag door tethers. Only after the airbag door 16 has pivoted mostly away from the airbag deployment opening does the folded portion 44 begin to unfold to allow the hinge side 18 of the airbag door to move away from the surrounding portion of the panel 10. Prior art tethers having single or serpentine folds that are unembedded in the panel substrate, such as the above-mentioned Laboeck configuration, unfold during the very first stages of airbag deployment. This causes the hinge side 18 of the airbag door 16 to move away from the surrounding portion of the panel 10 before the tether is sufficiently unfolded and taut to restrict airbag door motion to pivoting motion.

Such behavior is problematic with modern airbag systems, which deploy airbags having much larger volumes accompanied by ever-increasing inflation forces applied to the back side of the panel 10. Conventional tethers are subjected to these higher inflation forces because those forces continue to be applied to the airbag door 16 as it hovers over the deployment opening while the tether is unfolding instead of quickly pivoting out of the path of the deploying airbag in the manner that the disclosed hinge layer 24 provides.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for use over an airbag, comprising:
   a panel substrate having an airbag door region; and
   a flexible hinge layer having a first portion at least partially embedded in the airbag door region, a second portion at least partially embedded in the panel substrate outside the airbag door region, and a third portion interconnecting the first and second portions,
   wherein the third portion includes nested folds, and
   wherein the third portion is a wound portion in which hinge layer material is wrapped around at least one of the folds.

2. The vehicle interior panel of claim 1, wherein a total number of overlapping segments of hinge layer material in the third portion is an even number.

3. The vehicle interior panel of claim 1, wherein a total number of folds in the third portion is an odd number.

4. The vehicle interior panel of claim 1, wherein the third portion includes a double layer of hinge layer material having a wound conformation.

5. The vehicle interior panel of claim 1, wherein at least one of the nested folds is nested within at least two other of the nested folds.

6. The vehicle interior panel of claim 1, wherein at least one of the nested folds is nested within at least three other of the nested folds.

7. The vehicle interior panel of claim 1, wherein the third portion includes multiple segments of overlapping hinge material that are affixed to each other.

8. The vehicle interior panel of claim 1, wherein the third portion is at least partially embedded in the panel substrate.

9. The vehicle interior panel of claim 1, wherein the hinge layer is a sheet of material having openings defined therethrough.

10. The vehicle interior panel of claim 1, wherein the hinge layer is formed from a sheet of material having uniform tensile characteristics along its entire length and its entire width.

11. The vehicle interior panel of claim 1, wherein the hinge layer comprises warp and weft fibers and a polymeric coating disposed on the fibers.

12. A method of making the vehicle interior panel of claim 1, comprising:
   forming the wound portion from a sheet of the hinge layer material; and
   compressing the wound portion to form the third portion such that overlapping segments of the material are retained to each other in the third portion.

13. The method of claim 12, wherein the sheet of hinge layer material comprises a coating that adheres to itself where the overlapping segments contact each other during the step of compressing.

14. The method of claim 12, further comprising the step of overmolding the panel substrate onto the hinge layer after the step of compressing, including at least partially embedding the first portion in the airbag door region, the second portion in the panel substrate outside the airbag door region, and the third portion in the panel substrate along a boundary of the airbag door region.

15. A vehicle interior panel for use over an airbag, comprising:
   a panel substrate having an airbag door region; and
   a flexible hinge layer having a first portion at least partially embedded in the airbag door region, a second portion at least partially embedded in the panel substrate outside the airbag door region, and a third portion interconnecting the first and second portions,
   wherein the third portion includes nested folds, and
   wherein the hinge layer is a sheet of material having openings defined therethrough.

16. The vehicle interior panel of claim 15, wherein the third portion includes a double layer of hinge layer material having a wound conformation.

17. The vehicle interior panel of claim 15, wherein at least one of the nested folds is nested within at least two other of the nested folds.

18. The vehicle interior panel of claim 15, wherein the third portion includes multiple segments of overlapping hinge material that are affixed to each other.

19. The vehicle interior panel of claim 15, wherein the hinge layer comprises warp and weft fibers and a polymeric coating disposed on the fibers.

20. A method of making the vehicle interior panel of claim 15, comprising:
   forming a wound portion from the sheet of material; and
   compressing the wound portion to form the third portion such that overlapping segments of the sheet of material are retained to each other in the third portion.

* * * * *